United States Patent [19]

Golinelli et al.

[11] Patent Number: 4,555,855
[45] Date of Patent: Dec. 3, 1985

[54] ELECTRONIC GAUGE WITH AT LEAST ONE MOVABLE ARM AND A RETRACTION DEVICE

[75] Inventors: Guido Golinelli, Bologna; Carlo Dall'Aglio, Volta Reno di Argelato, both of Italy

[73] Assignee: Finike Italiana Marposs S.p.A., S. Marino di Bentivoglio, Italy

[21] Appl. No.: 525,409

[22] Filed: Aug. 22, 1983

[30] Foreign Application Priority Data

Sep. 9, 1982 [IT] Italy ................................. 3529 A/82

[51] Int. Cl.⁴ .............................................. G01B 7/12
[52] U.S. Cl. ........................... 33/147 K; 33/147 N; 33/178 E; 324/207
[58] Field of Search ........ 324/207, 208, 227, 219–221; 33/143 L, 147 K, 147 N, 178 E, 178 F

[56] References Cited

U.S. PATENT DOCUMENTS 4,306,455  12/1981  Selleri ............................ 324/227 X
4,420,889  12/1983  Possati et al. ................. 33/178 E X
4,447,960   5/1984  Golinelli et al. ................. 33/178 E

FOREIGN PATENT DOCUMENTS 664927  8/1964  Italy .
965618  5/1972  Italy .

Primary Examiner—Gerard R. Strecker
Attorney, Agent, or Firm—Stevens, Davis, Miller & Mosher

[57] ABSTRACT

Electronic gauge for checking linear dimensions of mechanical pieces, comprising a casing, at least a movable arm, a position transducer and a retraction device. The retraction device includes an electromagnet fixed to an element supported by the casing, a flat armature adjustably fixed to the movable arm and a positive stop fixed to the armature and adapted to abut against another positive stop fixed to the electromagnet.

12 Claims, 1 Drawing Figure

U.S. Patent    Dec. 3, 1985    4,555,855
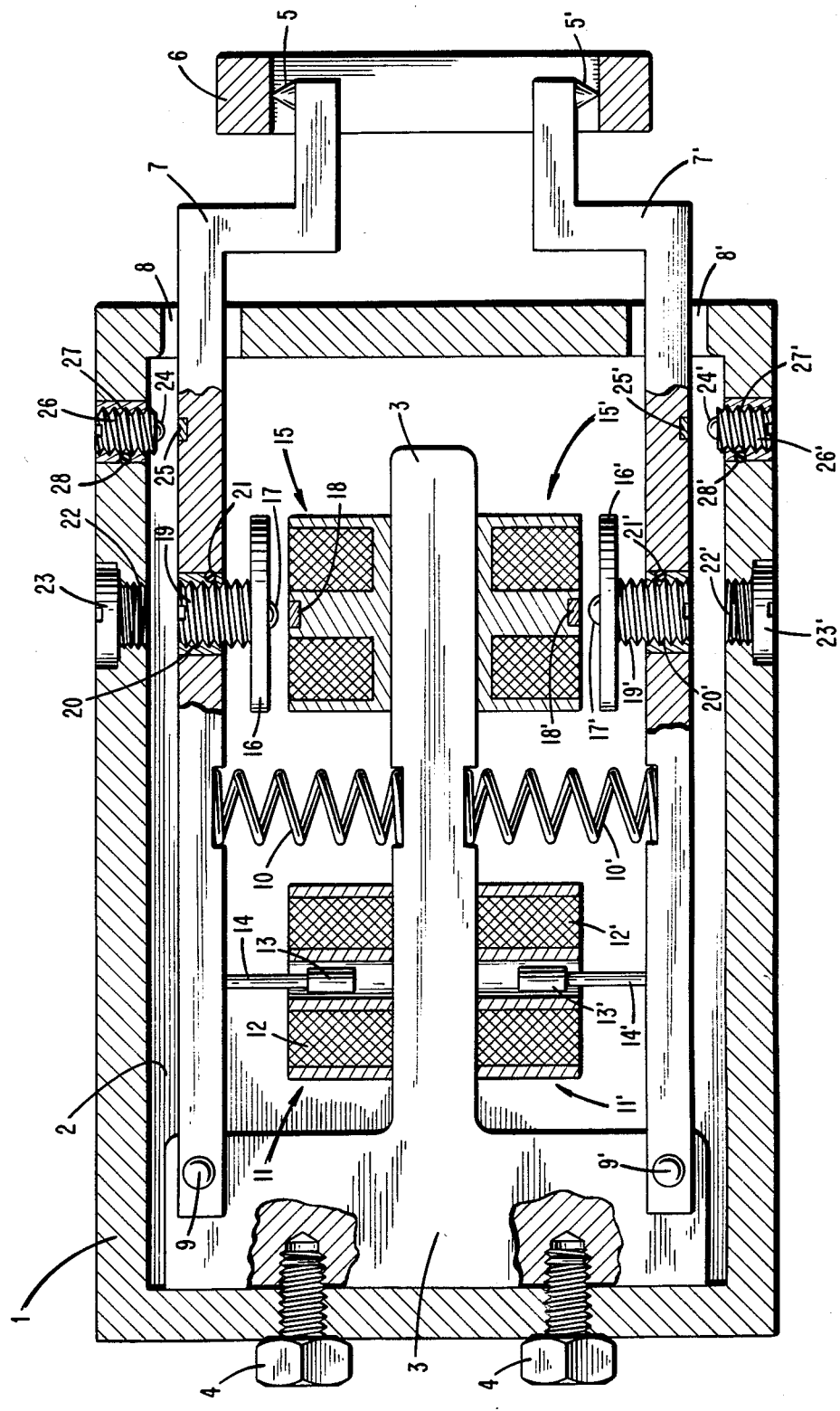

ELECTRONIC GAUGE WITH AT LEAST ONE MOVABLE ARM AND A RETRACTION DEVICE

BACKGROUND OF THE INVENTION

1. Field of the Invention

The present invention relates to an electronic gauge for checking linear dimensions of mechanical pieces, more specifically during machining on grinding machines, including an outer casing, at least a movable arm, a feeler coupled to the movable arm, resilient means adapted for urging the movable arm in a measurement direction, a position transducer for generating a signal responsive to the position of the movable arm, an electric retraction device including a first element consisting of an electromagnet and a second element consisting of an armature and adjustment means for setting the amount of retraction.

2. Description of the Prior Art

Conventional electronic gauges for application on grinding machines include one or two movable arms on which there are urged springs, or other equivalent devices, in order to bring the feelers, coupled to the movable arms, into contact with the surface of a piece, or, if the piece is not present, into a rest position.

In the case of two-feeler gauges, for inside and outside diameter checking, the rest positions correspond, respectively, to the maximum and minimum distance between the feelers.

These gauges are normally equipped with a "retraction"0 device, for retracting the movable arm, or arms, from the rest position to a retracted position, defined by mechanical positive stops, thus serving to prevent collision of the feelers against the piece to be checked, or against other obstacles, when the gauge is moved towards, or away from, the piece, by means of hydraulic slides or equivalent devices.

Retraction devices may be of different types (pneumatic, hydraulic, etc.), but the type generally preferred is the electrical type, because it is simpler, more practical and safe. In fact, a retraction device, e.g. of a pneumatic type, depends upon an external service, necessitating, for its operation, a pneumatic system, that has to use filtered air, and consequently additional equipment.

It is obvious that similar drawbacks, like lack of practicalness and safety, also affect hydraulic retraction systems.

Additionally, it could be required to adjust the amount of arm retraction depending, for example, on the geometrical characteristics of the piece to be checked.

More specifically, in the case of gauges for checking inside diameters during machining on a grinding machine, the amount of the retraction must not be too large in order to prevent accidental impacts of the feelers against the grinding wheel located inside the hole to be checked and occupying a considerable amount of the space defined by the hole.

An adjustable electrical retraction device, for example, is the one employed in the gauge for checking inside diameters disclosed in Italian Pat. No. 664.927, filed on Mar. 21, 1962. In this gauge an electromagnet attracts within its windings a core, ending at one of its ends with a conical-shaped head that, by moving and cooperating—through two rollers—with the movable arms, causes a mutual approach of the two feelers. The amplitude of this movement can be set by adjusting (by means of a screw knob) a positive stop that limits the amount of displacement of the core.

In Italian Pat. No. 965.618 filed on May 23, 1972, there is described another type of gauge for checking inside diameters, comprising two movable arms carrying two flat surface armatures that are attracted by two electromagnets supported by the gauge casing. The amount of retraction is set by rotating a disk having two slots which house two reference elements fixed to the armatures.

In general, owing to the limited space available on grinding machines, it is advisable that gauges have rather small dimensions. Moreover, if the electromagnets of the retraction device have relatively high power they can give rise to an excessive thermal dissipation that may cause drifts in the performance of the gauge.

At the same time, however, if the attraction force applied by the electromagnet is not sufficiently high, there can occur, as a consequence of grinding machine vibrations, inconveniences in the retraction device, for example the unwanted release of the movable arms.

The retraction devices of the gauges described in the two previously mentioned Italian Patents, necessitate, in order to ensure their safe operation, electromagnets having rather high power and involving, consequently, excessive thermal dissipations.

With reference to the gauge described in the first of the two Italian Patents this depends, on the one hand, on the fact that the retraction device has a structure based on the "sucking" of the core within the windings. Moreover, in both the gauges described in the formerly mentioned Italian Patents, the attraction force applied by the electromagnets, on the core and armature respectively, under a condition of retraction of the movable arms, depends on the position of the adjustment devices, i.e. on the position of the positive stop and of the disk with slots.

Consequently, in the two formerly mentioned gauges there is achieved a poor compromise among the contrasting requirements of having small dimensions and thermal dissipations, safe performance of the retraction devices, broad adjustment range of the amount of retraction.

SUMMARY OF THE INVENTION

The technical problem that the present invention intends to solve is that of providing a gauge with an adjustable retraction device which is very reliable, has a broad adjustment range, permits—in a way that does not depend on a particular setting—the risk of a possible release of the retraction, and that can be constructed with small overall layout dimensions.

This technical problem is solved by a gauge of the type outlined at the beginning of the description wherein, according to the invention, the adjustment means are fixed to one of said elements of the retraction device, this element and the adjustment means being simultaneously adjustable.

BRIEF DESCRIPTION OF THE DRAWING

The invention is now described in more detail according to a preferred embodiment illustrated in the accompanying drawing given by way of non-limiting example, in which there is shown a lateral partially sectional view of a gauge with two movable arms for inside diameter checking.

DETAILED DESCRIPTION

The gauge includes an outer casing 1 to which there are coupled two lateral plates, only one of which, 2, is visible in the drawing; a support element 3, of a substantially T-shape, is fixed at a side of the casing by means of screws 4.

A pair of feelers 5, 5' is made to contact a workpiece to be checked 6. Feelers 5, 5' are coupled to arms 7, 7' that protrude from casing 1 through holes 8, 8'. Arms 7, 7', elongated along a longitudinal direction of the gauge, are coupled to element 3 by means of pins 9, 9', that enable the arms to accomplish rotatory movements about axes that are perpendicular to the plane of the drawing.

Each feeler 5, 5' is kept into contact with piece 6 by means of a return spring 10, 10' arranged between arm 7, 7' and fixed element 3.

The position of arms 7, 7' is detected by means of two inductive transducers 11, 11' including a first portion 12, 12', basically consisting of electrical windings, fixed to element 3 and a core 13, 13' coupled to arm 7, 7' by means of a stem 14, 14'.

The gauge includes two retraction devices with two first elements basically consisting of electromagnets 15, 15' and two second elements basically consisting of disk shaped armatures 16, 16'. The electromagnets 15, 15' have ironclad coils with cores fixed to the mid stem of element 3 and have the purpose of attracting arms 7, 7' by acting on armatures 16, 16' made of ferromagnetic material, coupled to arms 7, 7'.

At the center of armatures 16, 16' there are carbide positive stops 17, 17' with a semispheric shape, that cooperate with other positive stops 18, 18' fixed to the cores of electromagnets 15, 15'. Positive stops 17, 17' form retraction adjustment means.

The adjustment of the retraction occurs through axial displacements of the positive stops 17, 17' by screwing or unscrewing two threaded stems 19, 19', integral to armatures 16, 16', in associated threaded holes 20, 20' of arms 7, 7'. Stems 19, 19' are perpendicular to arms 7, 7' and adjustable perpendicularly to them, i.e. substantially along a direction parallel to the measurement direction of arms 7, 7'. Between the walls of holes 20, 20' and stem 19, 19' there are inserted friction devices, consisting of thread inserts 21, 21' that ensure the safety and stability of the adjustment.

In order to accomplish this adjustment access is gained from the outside by introducing a screwdriver, into slots obtained at the end of stems 19, 19', through two openings 22, 22'—formed in casing 1 and aligned with holes 20, 20'—that, under working conditions, are sealed by caps 23, 23'.

As it can be seen, by altering the retraction setting adjustment, the air gap between every electromagnet 15, 15' and its associated armature 16, 16', when retraction is activated, remains constant and very small, as its entity is defined by the thickness of positive stop 17, 17'.

Two positive stops 24, 24' are fixed to associated threaded stems 26, 26' that engage through intermediate thread inserts 28, 28', the surfaces of threaded holes 27, 27' of the external casing 1. Another pair of carbide positive stops 25, 25' is fixed to arms 7, 7' for cooperating with positive stops 24, 24' and limiting the stroke of the arms while they move in the measurement directions, so establishing the so called rest position. In order to adjust the entity of this stroke it is necessary to adjust stems 26, 26'.

Sealing gaskets—not shown—seal holes 8, 8', enabling at the same time the moving of movable arms 7, 7'. In order to dampen the displacements of movable arms 7, 7', the interior of the gauge can be filled with dampening silicone liquids.

The round-shaped surfaces of armatures 16, 16' facing the free ends or bases of electromagnets 15, 15' have almost identical dimensions as those of the same bases, and this provides a high ratio between the retraction forces applied by electromagnets 15, 15' on armatures 16, 16' and the layout dimensions of the entire retraction device.

At the same time it is possible to set the amount of retraction in a rather broad range (e.g. a few millimeters) because the attraction forces applied by electromagnets 15, 15' on armatures 16, 16', when arms 7, 7' are in a retracted condition, do not depend on a specific setting of armatures 16, 16', or of the positive stops 17, 17' with respect to movable arms 7, 7'.

Once retraction has been actuated, it is possible to power supply the electromagnets with less current, so providing less thermal power dissipations, but guaranteeing at the same time a sure holding of the retraction.

The described gauge also ensures high accuracy levels of the retraction device as the retracted position is defined by the contacting of the semispherical surfaces of positive stops 17, 17' with the plane surfaces of positive stops 18, 18' and is not substantially affected by the presence of dust or any other foreign matter that may possibly enter inside the gauge.

What is claimed is:

1. An electronic gauge for checking linear dimensions of mechanical pieces, more specifically during machining on a grinding machine, comprising an outer casing, support means fixed to said casing, at least a movable arm pivotally attached to said support means, a feeler coupled to the movable arm, resilient means cooperating with the movable arm for urging it in a measurement direction, a position transducer including two mutually movable elements, one of said elements being coupled to the movable arm, the position transducer providing a signal depending on the positions of the movable arm with respect to said support means, an electric retraction device for retracting the movable arm to a retracted position, said retraction device including two elements respectively coupled to said movable arm and said support means, said two elements of the retraction device including a first element consisting of an electromagnet and a second element consisting of an armature and adjustment means adapted to cooperate with said arm for setting said retracted position, and wherein said adjustment means are fixed to one of said elements of the retraction device, this element and the adjustment means being simultaneously adjustable.

2. The gauge according to claim 1, wherein said adjustment means include a first mechanical positive stop, fixed to said armature; and a second mechanical positive stop coupled to the electromagnet, the first and the second positive stops being adapted for contacting each other for defining said retracted position.

3. The gauge according to claim 2, wherein the electromagnet is coupled to said support means and the armature is coupled in an adjustable way to the movable arm.

4. The gauge according to claim 3, wherein said armature has a substantially disk-like shape, facing an end of the electromagnet.

5. The gauge according to claim 4, wherein said armature is coupled to the movable arm by means of a spindle, through a threaded coupling.

6. The gauge according to claim 5, wherein said first mechanical positive stop is coupled to the armature at a position corresponding to the center of the armature.

7. The gauge according to claim 5, wherein said threaded coupling includes a thread insert friction device.

8. The gauge according to claim 2, wherein said casing has holes for providing accessibility from the outside to the adjustment means.

9. The gauge according to claim 2, wherein one of said positive stops has a round-shaped surface and the other positive stop has a plane surface.

10. The gauge according to claim 3, further including a second movable arm, a second feeler, a second transducer, a second retraction device and a second adjustment means, said casing including a front side with holes for the passage of the movable arms and a rear side, wherein said support means include a support element fixed to the rear side of the casing and carrying the movable arms and the electromagnets.

11. An electronic gauge for checking linear dimensions of workpieces, comprising:
an outer casing;
support means fixed to the casing;
two measuring arms movably mounted on the support means, the measuring arms having ends carrying feelers for contacting the workpiece;
transducer means coupled to the measuring arms for providing a measurement signal representative of the mutual positions of the measuring arms;
spring means acting on the measuring arms for displacing them along a measurement direction; and
two retraction devices respectively coupled to the measuring arms, each retraction device including: an electromagnet fixed to the support means, an armature facing the electromagnet, the armature being adjustably coupled to the relevant measuring arm, and stop means including a first stop element fixed to the electromagnet and a second stop element fixed to the armature and adapted to abut against the first stop element for defining a retraction position of said relevant measuring arm, whereby the retraction position can be adjusted by adjusting said armature.

12. An electronic gauge for checking internal diameters of workpieces, comprising:
an outer casing;
support means fixed to the casing;
two measuring arms mounted on the support means for pivotal movements, the measuring arms including relevant feelers arranged at free ends of the same arms for contacting the workpiece;
transducer means coupled to the measuring arms for providing signals representative of the mutual positions of the measuring arms;
spring means acting on the measuring arms for pivotally displacing them to approach the feelers towards each other; and
two adjustable retraction devices respectively coupled to the measuring arms, each retraction device including: an electromagnet fixed to the support means; a stem rotatably coupled to a relevant measuring arm to be adjustable along a direction substantially parallel to the measurement direction of the measuring arm; an armature facing the electromagnet, the armature being fixed to the stem and having the shape of a circular disk; a first stop element fixed to the side of the armature facing the electromagnet at a central position of the armature; and a second stop element fixed to the electromagnet and adapted to provide an abutment for the first stop element.

* * * * *